United States Patent

Abruzzese et al.

[11] Patent Number: 5,943,664
[45] Date of Patent: Aug. 24, 1999

[54] MEMORY AND METHOD FOR STORING MEMBERSHIP FUNCTIONS USING VERTICES AND SLOPES

[75] Inventors: Massimo Abruzzese, Catania; Biagio Giacalone, Trapani, both of Italy

[73] Assignee: Consorzio per la Ricerca sulla Microelettronica nel Mezzogiorno, Catania, Italy

[21] Appl. No.: 08/858,125

[22] Filed: May 19, 1997

Related U.S. Application Data

[63] Continuation of application No. 08/407,688, Mar. 21, 1995, abandoned.

[30] Foreign Application Priority Data

Mar. 31, 1994 [EP] European Pat. Off. .............. 94830158

[51] Int. Cl.⁶ .................................................. G06F 17/00
[52] U.S. Cl. .............................. 706/52; 706/1; 706/900
[58] Field of Search .............................. 395/3, 61, 900; 706/3, 52, 900, 1, 4, 8

[56] References Cited

U.S. PATENT DOCUMENTS

| | | | |
|---|---|---|---|
| 5,142,664 | 8/1992 | Zhang | 706/4 |
| 5,179,629 | 1/1993 | Nakamura | 706/6 |
| 5,259,063 | 11/1993 | Salazar | 706/4 |
| 5,280,624 | 1/1994 | Ikeda | 706/4 |
| 5,299,283 | 3/1994 | Hamamoto | 706/4 |
| 5,410,633 | 4/1995 | Ota | 706/7 |
| 5,422,979 | 6/1995 | Eichfeld | 706/4 |
| 5,448,713 | 9/1995 | Hamamoto | 711/154 |
| 5,459,816 | 10/1995 | Baseshore | 364/148.05 |
| 5,479,566 | 12/1995 | Ishimoto | 706/4 |
| 5,491,775 | 2/1996 | Madau | 706/4 |
| 5,495,558 | 2/1996 | Tashima | 706/52 |
| 5,495,574 | 2/1996 | Miyazawa | 706/4 |
| 5,497,449 | 3/1996 | Miyazawa | 706/52 |
| 5,524,174 | 6/1996 | Eichfeld | 706/4 |
| 5,526,467 | 6/1996 | Ejima | 706/52 |

FOREIGN PATENT DOCUMENTS

| | | | |
|---|---|---|---|
| A-0574714 | 12/1993 | European Pat. Off. | G06F 7/48 |
| A-3936503 | 5/1990 | Germany | G06F 15/35 |

OTHER PUBLICATIONS

IBM Technical Disclosure Bulletin, vol. 20, No. 12, May 1978, New York, US, pp. 5370–5371, "Bresenham Data Compression Technique".

European Search Report from European Patent Application 94830158.5 filed Mar. 31, 1994.

Togai et al., "Expert System on a Chip: An Engine for Approximate Reasoning," Fuzzy Expert Systems, pp. 267–268, CRC Press 1992. Dec. 1992.

*Primary Examiner*—Tariq R. Hafiz
*Assistant Examiner*—Jason W. Rhodes
*Attorney, Agent, or Firm*—Wolf, Greenfield & Sacks, P.C.

[57] ABSTRACT

Memory and storage method in an electronic controller operating with fuzzy logic procedures for membership functions (FA) of logical variables (M) defined in a so-called discourse universe (U) discretized at a finite number of points (m) which provide memorization of triangular or trapezoid membership functions (FA). Memory words have a first portion for codification of the vertex of the membership function (FA), a second portion for a codification corresponding to the slope of one side of the membership function (FA), and a third portion for a codification corresponding to the slope of the other side of the function.

23 Claims, 4 Drawing Sheets

| | LEFT SLOPE | VERTEX | RIGHT SLOPE |
|---|---|---|---|
| $FA_1$ | 1111 | 00010100 | 0001 |
| $FA_2$ | 0001 | 00111111 | 0001 |
| $FA_3$ | 0001 | 01010111 | 0001 |
| $FA_4$ | 0001 | 01110000 | 1111 |

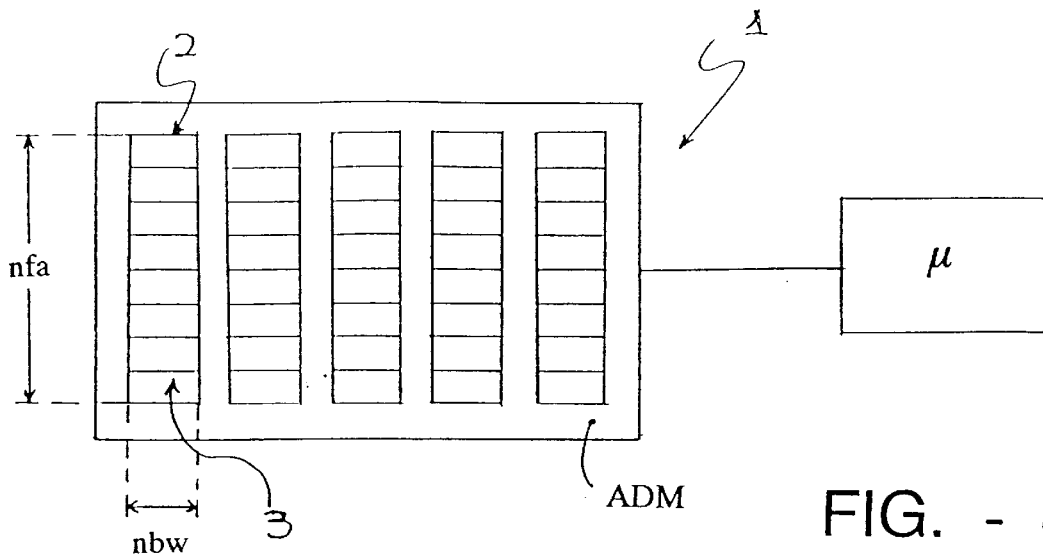
FIG. - 4
|  | LEFT SLOPE | VERTEX | RIGHT SLOPE |
|---|---|---|---|
| $FA_1$ | 1111 | 00010100 | 0001 |
| $FA_2$ | 0001 | 00111111 | 0001 |
| $FA_3$ | 0001 | 01010111 | 0001 |
| $FA_4$ | 0001 | 01110000 | 1111 |
FIG. - 5
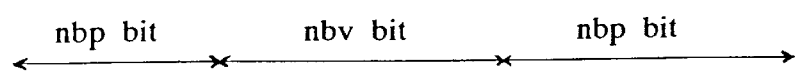
| LEFT SLOPE | VERTEX | RIGHT SLOPE |
|---|---|---|
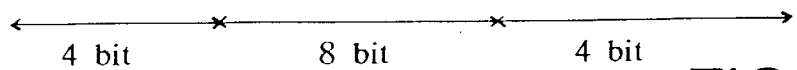
FIG. - 6

SYMMETRIC FA

ASYMMETRIC FA

'CRISP' FA

MEMORY AND METHOD FOR STORING MEMBERSHIP FUNCTIONS USING VERTICES AND SLOPES

This application is a continuation of application Ser. No. 08/407,688, filed Mar. 21, 1995, now abandoned.

BACKGROUND OF THE INVENTION

1. Field of the Invention

The present invention relates to a storage method for data on membership functions in a processor operating with fuzzy logic procedures. Specifically the present invention relates to a storage method in an electronic controller operating with fuzzy logic procedures for membership functions of logical variables defined in a so-called discourse universe discretized at a finite number of points and said method providing memorization of triangular or trapezoid membership functions FA.

2. Discussion of the Related Art

Fuzzy logic is now accepted as a technique capable of supplying solutions for a broad range of control problems for which the conventional techniques, e.g. those based on Boolean logic, have proven unsuitable for providing acceptable performance at an acceptable cost.

Fuzzy logic operates on a linguistic description of reality using a particular class of variables termed linguistic variables. The value of said variables consists of words or phrases of a natural or artificial language. Basically, to each variable is assigned a corresponding semantic meaning of the words or phrases which are used in modelling of a given problem.

In addition, with each variable can be syntactically combined a group of values dependent on it and which can take on different meanings depending on the context in which they are employed. These values are obtained starting from a primary term representing the variable, from its contrary, and from a series of so-called modifiers of the primary term. Such a system is described in European patent application no. 92830095.3.

Each value assigned to a linguistic variable is represented also by a so-called fuzzy set, i.e. a possibilistic distribution function which links each value of the variable in the corresponding definition domain, known also as discourse universe.

The functions which identify a fuzzy set in the discourse universe of a variable are termed membership functions f(m). For example, a value f(m)=0 indicates non-membership of the point m in the fuzzy set identified by the function f whereas value f(m)=1 indicates the certainty of the membership of n in the fuzzy set. The entirety of all the fuzzy sets of a linguistic variable is termed 'term set'.

Appropriate logical operations can be performed with membership functions, termed inferences, which permit description of the behavior of a system with the variation of the input parameters. These operations are performed by means of fuzzy rules which have generally a syntax of the type:

IF X IS A, THEN Y IS B where X is the input value, A and B are membership functions which represent knowledge of the system, and Y is the output value.

The part of the rule which precedes the term THEN is termed 'left' or antecedent, while that which follows it is termed 'right' or consequent part of the inference rule.

The electronic data processing instruments which allow performance of the operations on the membership functions must be provided with a particular architecture expressly dedicated to the entirety of inference operations which constitute the fuzzy logic computational model.

To obtain a satisfactory result it is however of basic importance that the membership functions of the fuzzy sets be sufficiently and correctly defined in the control device. Indeed, the more said definition reflects the semantics of the fuzzy concept the more the incidence of a term in a rule will be correct and consequently also the value output by the electronic controller operating with fuzzy procedures will better reflect reality.

At present, the definition or memorization in an electronic controller based on the fuzzy logic of the membership functions which identify the fuzzy sets represent one of the major constraints on the development of new fuzzy logic applications, thus limiting the theoretical potentials of this methodology.

Indeed, if for the implementation on hardware of the membership functions it is desired that said functions respect the semantics of the fuzzy concept so as to obtain a correct incidence of a term in a rule, one is forced to use considerable space in the memory. This makes fuzzy logic advantageous only for those applications where the term set of the linguistic variable consists of a small number of membership functions.

A first solution to this shortcoming consists of storing only certain points of a membership function. In particular, storing points in which the function changes inclination, thus obtaining a drastic reduction in memory size. But since the task of performing AND-function between said points to proceed with the actual fuzzy computation is assigned to the fuzzy device, there is a considerable increase in computation because of calculation of the intermediate points. In addition, the devices based on this method are inflexible because they operate with a limited number of forms of predetermined membership functions.

Devices which use this type of storage for the membership functions include machines called FP3000 from the OMRON Corporation, and the NLX-230 from the Neural Logix Corporation. These devices operate with digital technology representing the membership functions in analytical form.

Digital technology also allows representation of the membership functions in vectorial form while discretizing the discourse universe at a finite number of points and storing the corresponding degree of membership of the membership functions at these points.

Among the advantages of this technology, there is good definition of the membership functions in the control device and extreme simplicity in performing the computations, i.e. the fuzzy inferences.

With this high calculation speed is associated however considerable use of memory due to the fact that for each membership function the value it has at all points of the discourse universe must be stored.

The data for a membership function are stored in a memory word. In known devices the memory area occupied is thus negatively influenced by the amount of data necessary for defining these membership functions.

In many cases it is sufficient to store triangular or trapezoidal membership functions so as to reduce the amount of data necessary for their storage.

Processors which use this type of triangular function are known. For example, the NeuraLogic fuzzy controller NLX230 stores each membership function antecedent as the position of the vertex (using eight bits) and the value of the semi-base of the triangle (using another five bits, i.e. a range of thirty-two values ($2^5$) of which the greatest represents the height of the vertex).

This controller can only be used with symmetrical membership functions.

The NeuraLogic solution also exhibits problems for slopes other than 45°. Indeed, it is not possible to implement triangular functions with slopes less than 45° which necessitate semi-bases of sizes greater than those which can be represented by means of five bits. In addition, for semi-bases less than this value the NLX230 controller performs a 'cut' of the membership function as shown in FIGS. 1 and 2 where FA indicates a membership function.

Finally, with this type of storage, it is not possible to consider a number of truth levels different from that which can be represented with five bits.

The technical problem underlying the present invention is to provide a method for digital storage of the membership functions FA which would allow minimizing the size of the memory required for implementation on hardware of said functions.

This would allow keeping a high computation speed and optimization of storage of the membership functions FA while overcoming the shortcomings which still limit the known solutions.

SUMMARY OF THE INVENTION

The present invention uses a storage method for triangular membership functions FA using the value of the vertex and of the slopes of the triangle sides. A memory according to the present invention has a memory word for each membership function of each variable. The memory word includes three parts, the vertex, the left slope, and the right slope.

The characteristics and advantages of the memory and method in accordance with the present invention are set forth in the description of an embodiment thereof given below by way of example and not of limitation with reference to the annexed drawings.

BRIEF DESCRIPTION OF THE DRAWINGS

FIG. 4 shows the organization of a memory device in accordance with the present invention for storage of membership functions FA of the type of those of FIG. 3.

FIG. 5 shows a translation in binary code in accordance with the present invention of some membership functions FA of FIG. 3.

FIG. 6 shows the structure of a memory word which describes in accordance with the present invention one of the membership functions FA of FIG. 3.

DETAILED DESCRIPTION

Figure 1:
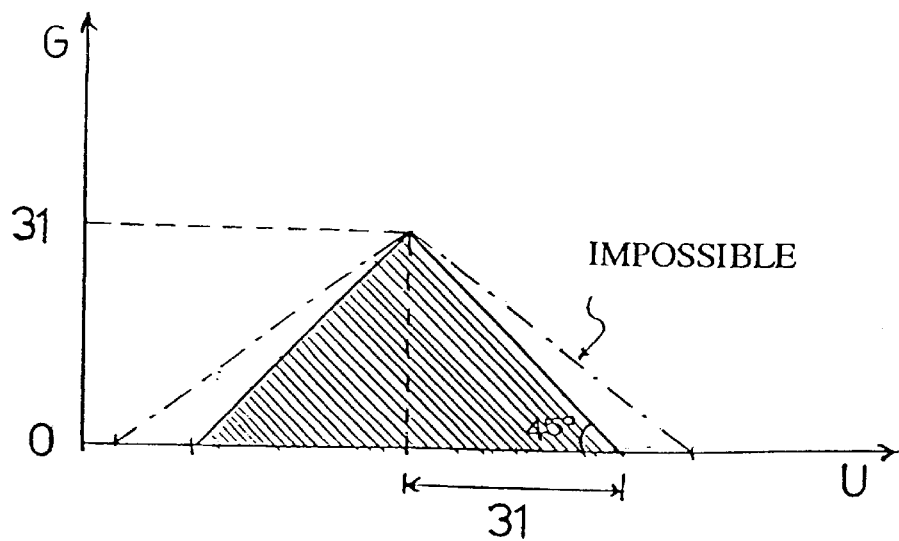
FIG. 1 shows schematically a possible membership function in fuzzy architecture provided in accordance with the known art.
Figure 2:
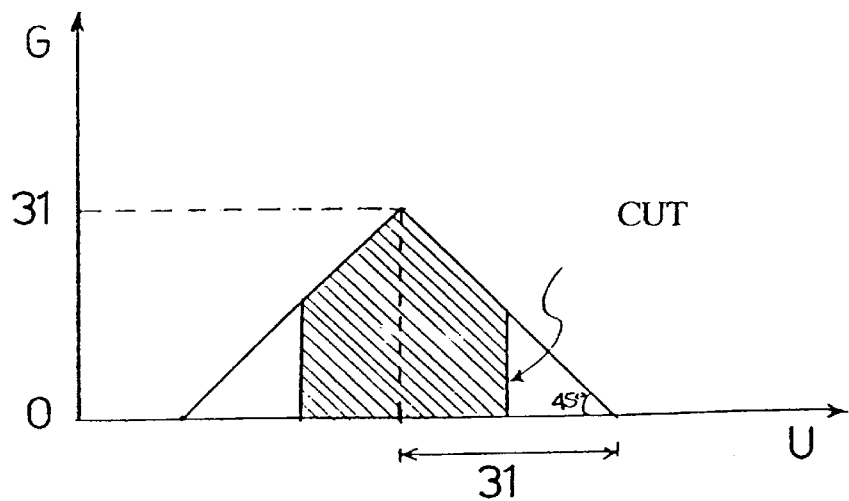
FIG. 2 shows a deformation of a membership function in a fuzzy architecture provided in accordance with the known art.
Figure 3:
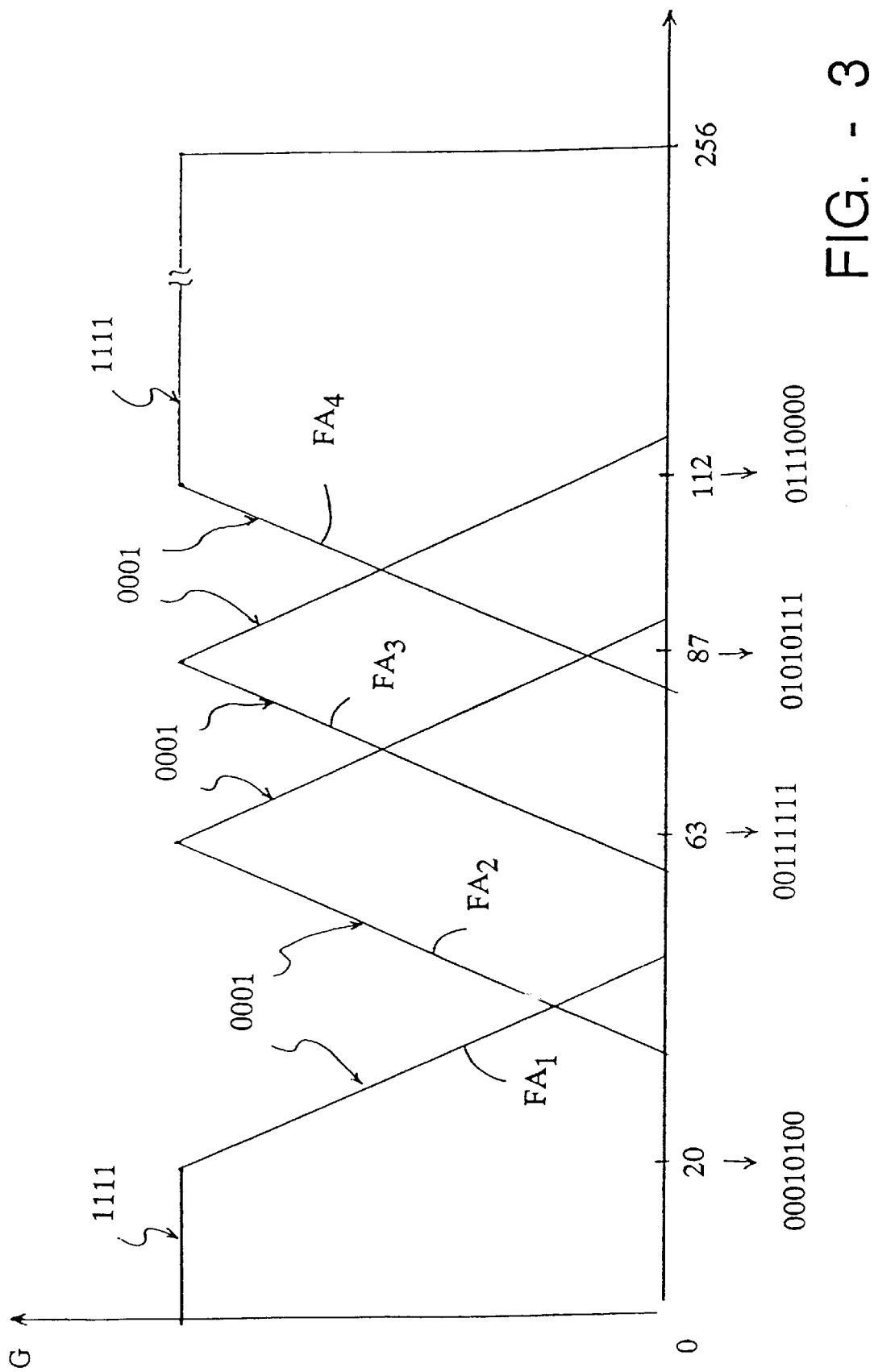
FIG. 3 shows a possible term set of membership functions FA storable by the method in accordance with the present invention.

With reference to FIG. 3 the term set of a linguistic or logical variable M is represented by means of a vectorial system. Along the axis of the abscissas is the so-called discourse universe U, and along the axis of the ordinates is the degree of truth or membership G.

In this specific case the discourse universe U and the degree of membership G are discretized into two hundred fifty-six points m and sixteen levels or values L. The term set consists in our example of four membership functions $FA_i$ which identify in the discourse universe U as many fuzzy sets (i is the index of each membership functions).

In FIG. 3 the membership functions FA are numbered with the indices i from one to four increasing from left to right. The term set represented in FIG. 3 could be e.g. a display in vectorial form of the variable 'temperature'.

A linguistic variable of this type lends itself to a mathematical modelling based on fuzzy logic.

With an electronic control device provided for operation in fuzzy procedure and described, e.g., in European patent application no. 92830095.3 it is possible to put into effect a fuzzy logic modelling of linguistic variables of the type represented by the term set of FIG. 3.

With reference to FIG. 4, 1 indicates schematically as a whole an electronic memory device provided in accordance with the present invention. For the sake of simplicity of exposition let us assume that said device is the antecedent data memory (ADM), i.e., the data of the functions located in the antecedent part of the inference rules.

Said antecedent data memory ADM is connected to the microprocessor $\mu$ and is divided in multiple memories 2 each having dimensions equal to:

nfa (words)*nbw (bits)

where:
nfa is the maximum number of membership functions FA which make up the term set of the input variables, and
nbw is the number of bits of each word making up each memory 2.

The antecedent data memory ADM will thus have an overall size given by:

nfa (words)*n (memories)

where n is the number of inputs of the fuzzy processor.

Since each word must contain the data for a membership function FA its length will depend on the methodology used to memorize it.

In the method in accordance with the present invention each membership function FA has a triangular form or at best trapezoidal at the edges of the discourse universe U. It is possible to define completely these functions by means of the coordinates of their vertex and of the value of the left and right slopes of the vertex of their graph.

In the method in accordance with the present invention a memory word has the structure of FIG. 5 where a first portion comprises nbp bits which memorize a logical or digital value corresponding to the slope of the left side and a second and adjacent portion comprises nbv bits which memorize the position of the vertex in the discourse universe U (number of bits equal to the number of levels which make up the discourse universe U) and a third and terminal portion comprises nbp bits which memorize the value of the slope of the right side.

It is seen thus that the size of a memory word is equal the:

nbw=(2*nbp)+nbv

Advantageously in accordance with the present invention the value of the nbp bits which memorize the right and left slopes of the membership function FA depend on the value of a flag which we shall call 'inclination_type' which is in turn memorized in the microprocessor $\mu$.

If the value of the flag is zero, the nbp bits in the memory word indicate the number of vertical levels by which the membership function FA is decreased at each horizontal unitary increase starting from the coordinate of the vertex.

For example, a binary value of 3 indicates that the membership function FA at the point of the discourse universe U which follows the coordinate of the vertex has a height three levels less than that of the vertex.

Vice versa, if the value of the flag is one, nbp bits of the memory word indicate after how many points of the discourse universe U the ordinate of the membership function FA is decreased by one unit in relation to the height of the vertex.

The storage method for membership functions FA in accordance with the present invention for a processor operating with fuzzy logic operates on the basis of two flags termed 'left inclination_type' and 'right inclination_type'. It is possible in this manner to use both of the above mentioned definitions in the same process obtaining a large number of different slopes both in the immediate proximity of the 'vertex' and in the rest of the discourse universe U.

In total there can be described up to:

$$(2*(2^{nbp})-2)^2$$

different types of membership function FA located at any point of the discourse universe U.

To better explain the mechanism underlying the memorization of membership functions FA in accordance with the present invention let us consider for example a case with nbp=4. In this manner the slope can take on the values from 0 to 15: the value 0 indicates a straight vertical line while the value 15 indicates a straight horizontal line.

The values from 1 to 14 combined with the 'left inclination_type' and 'right inclination_type' flags characterize the various inclinations of the triangle so that there can be described 14+14=28 different inclinations.

There are thus obtained at least thirty different types of slopes for the left part and the same number for the right part. In total the user can choose among 900 different membership functions FA.

Figure 7:
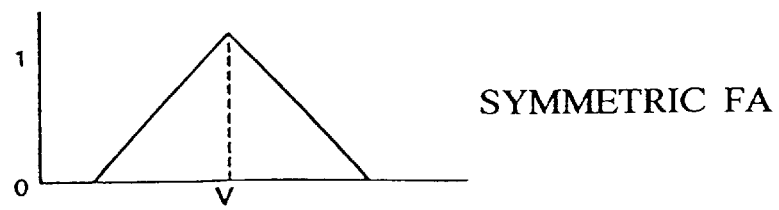
FIG. 7 shows some types of membership functions FA storable by the method in accordance with the present invention.
Figure 7:
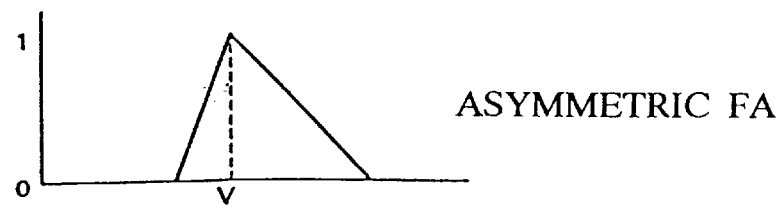
Figure 7:
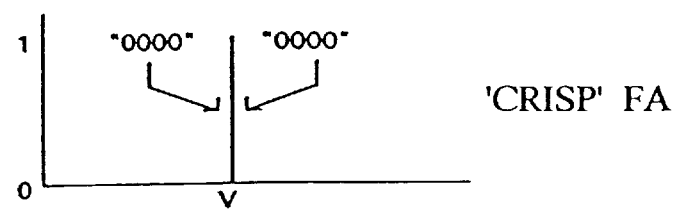
Figure 7:
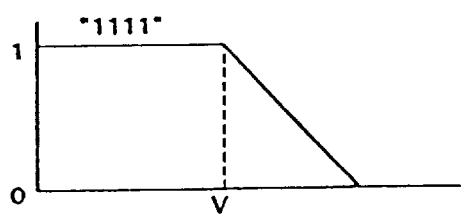
Figure 7:
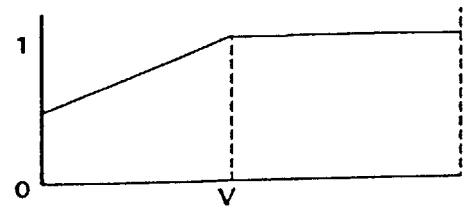
Figure 7:
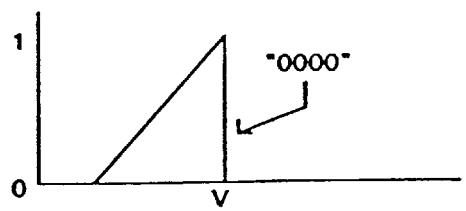
Figure 7:
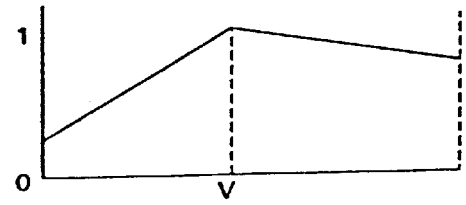
Figure 7:
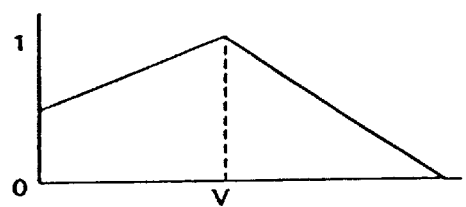
Figure 7:
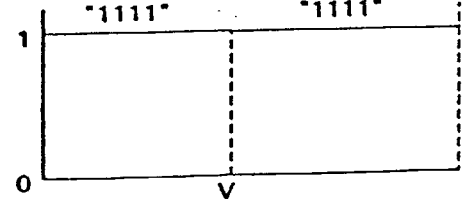

FIG. 7 shows some of the membership functions FA which the user can describe.

Assuming that the discourse universe U is made up of 256 points (from 0 to 255), i.e., it can be described by means of 8 bits ($2^8$=256), a single membership function FA can he described by a word made up of 16 bits divided as follows:

8 bits to indicate the position of the vertex of the membership function FA since the vertex can take on any value in the discourse universe U, 4 bits to indicate the slope of the LEFT part of the membership function FA, and 4 bits to indicate the slope of the RIGHT part of the membership function FA.

The structure of the memory word is shown in FIG. 6. For convenience the 4 bits for the left slope are placed to the left of the vertex in the word while the 4 bits for the right slope are place to the right of the vertex in the word.

In the term set of FIG. 3 are shown the values of the positions of the vertices and the transformations in binary code of the slopes of the sides. In the case of trapezoid membership functions FA the vertex indicates the point of the discourse universe U at which the membership function FA changes slope.

The corresponding memory words are shown in the table of FIG. 5.

This storage method for the membership functions FA permits implementation of a fuzzy architecture using extremely small memory devices. The reduction factor compared with the vectorial representation can be clarified by the following examples.

Let us consider initially a fuzzy architecture with 8 inputs and 8 membership functions FA while the discourse universe U is divided in 128 ranges and the maximum value of the heights of the vertices is 15.

Under these conditions the antecedent memory passes from the vectorial representation:

$$4*(128*64) \text{ bits } (4,096 \text{ Kbyts})$$

to the representation in accordance with the present invention:

$$8*(8*13) \text{ bits } (104 \text{ Kbytes})$$

There is obtained in this first case a reduction factor equal to:

$$\text{red. } \% = 1-(104/4096) = 97.5\%$$

If there is considered then the case of a fuzzy architecture with still 8 inputs and 8 membership functions FA but with a discourse universe U divided in 256 ranges and a maximum value of the heights of the vertices equal to 63 there is found for the vectorial representation:

$$4*(256*96) \text{ bits } (12,288 \text{ Kbytes})$$

and for the representation in accordance with the present invention:

$$8*(8*16) \text{ bits } (128 \text{ Kbytes})$$

i.e. a reduction factor equal to:

$$\text{red. } \% = 1-(128/12288) = 99\%$$

Advantageously in accordance with the present invention it is possible to modify the height of the vertex without having to change the data memorized in the antecedent data memory ADM.

This could be important in those cases where it is necessary to obtain high precision of the fuzzy controller, a precision linked to a high number of truth levels L, rather than a high resolution m of the discourse universe U.

In addition it is possible to increase the number of input variables, in the examples considered again equal to 8 since this value is sufficient in the majority of common commercial applications, by merely adding a memory of (nfa*nbw) bits for each additional input.

It is also possible to increase the number of membership functions FA of the term set considered by adding a word for each additional membership function FA or extending the discourse universe U while increasing the dimensions of the words used.

Finally it is possible to increase the internal parallelism for calculation of the coordinates of the vertices so as to obtain very fast timing, employing extremely small memory devices.

From a thorough examination it can be observed that with the memory organization method in accordance with the present invention the requirements of a large number of fuzzy logic applications are satisfied.

Although binding the user to the use of triangular or trapezoid membership functions FA the result is an adequate model for the majority of applications.

Among the principal advantages secured by the memory organization method in accordance with the present invention is the fact that the antecedent memory area is increased in a negligible manner with variation of the number of inputs, of the number of membership functions FA and of the degree of discretization of the discourse universe U.

Furthermore the degree of vertical discretization does not affect the dimensions of the memory and computation of the heights of the membership functions FA at the points m of the discourse universe U performed by a combinatory network is not slowed.

Lastly, there is a clear saving of memory area by applying the storage method in accordance with the present invention.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for storing membership functions of logical variables defined in a discourse universe discretized at a finite number of points in a memory to be accessed by a processor implementing fuzzy logic procedures, said method comprising the step of:

storing, for each membership function, a single memory word in the memory, the memory word including first, second and third portions, the first portion storing a vertex of the membership function, the second portion storing a value of a slope of one side of the membership function, and the third portion storing a value of a slope of another side of the membership function; wherein the value of the slope stored in the second portion of the memory word is adjustable independent of the value of the slope stored in the third portion of the memory word, and the value of the slope stored in the third portion of the memory word is adjustable independent of the value of the slope stored in the second portion of the memory word, each memory word being stored in the memory such that the processor accesses the memory word to perform an inference operation based upon the membership function represented thereby.

2. The method in accordance with claim 1 wherein said one side and said other side of each membership function intersect at the vertex of the membership function.

3. The method in accordance with claim 1 wherein the first portion of each memory word includes a number of bits equal to a number necessary to describe the discourse universe.

4. The method in accordance with claim 1 wherein the second portion of each memory word includes a number of bits equal to a number necessary to describe the slope of one side of a membership function.

5. The method in accordance with claim 1, wherein the membership functions are stored in a plurality of memory words of dimensions given by:

$$nbw=(2*nbp)+nbv$$

where:
nbw is the number of bits contained in a memory word,
nbp is the number of bits necessary for storing the slope of the membership function (FA) and
nbv is the number of bits necessary for storing the vertex of the membership function (FA).

6. The method in accordance with claim 5, wherein the memory words for an input variable are located in a memory of size equal to:

$$nfa\ (words)*nbw\ (bits)$$

where:
nfa is the maximum number of membership functions making up the term set of the fuzzy input variables.

7. The method in accordance with claim 5 wherein the first portion of each memory word containing the vertex can be modified depending on the discourse universe.

8. The method in accordance with claim 5, wherein for each additional input variable the size of the memory is increased by (nfa*nbw) bits.

9. The method in accordance with claim 5, wherein for each additional membership function added to a term set the size of the memory is increased by one memory word.

10. The method in accordance with claim 1, wherein a meaning of each slope value depends on a state of a corresponding flag stored in a location other than in the memory word storing tie slope value, the corresponding flag never being stored in the memory word storing the slope value.

11. The method in accordance with claim 1, wherein each memory word in the memory includes fewer than seventeen bits.

12. The method in accordance with claim 1, wherein each memory word in the memory consists of sixteen bits.

13. The method in accordance with claim 1, wherein, for each memory word, a number of bits in the second portion is equal to a number of bits in the third portion.

14. A method for storing membership functions of logical variables defined in a discourse universe discretized at a finite number of points in a memory to be accessed by a processor implementing fuzzy logic procedures, said method comprising the steps of:

storing, for each membership function, a vertex of the membership function in a first portion of a corresponding memory word in the memory;

storing, for each membership function, a value of a slope of one side of the membership function in a second portion of the corresponding memory word;

storing, for each membership function, a value of a slope of another side of the membership function in a third portion of the corresponding memory word;

wherein a meaning of each slope value depends on the value of a corresponding flag, the meaning of each slope value being one of:

a number of vertical levels by which the membership function is decreased for each horizontal unitary shift in the discourse universe, and after how many points of the discourse universe in relation to the coordinate of the vertex the height of the membership function is decreased by one unit; and wherein each corresponding memory word is stored in the memory such that the processor accesses the memory word to perform an inference operation based upon the membership function represented thereby.

15. A method for storing a membership function in a memory to be accessed by a processor implementing fuzzy logic procedures, comprising the steps:

storing a vertex of said membership function in a first portion of a memory word in the memory:

storing a slope of one side of said membership function in a second portion of said memory word; and storing a slope of a second side of said membership function in a third portion of said memory word; and setting a flag for selecting one of two meanings for at least one of the slopes stored in said memory word;

wherein at least one of said second and third storing steps includes defining a slope as one of:

a decrease in vertical level for a unitary increase in the discourse universe, and an increase in the discourse universe for a unitary decrease in the vertical level; and wherein the memory word is stored in the memory such that the processor accesses the memory word to perform an inference operation based upon the membership function represented thereby.

16. A memory for storing a plurality of membership functions to be accessed by a processor implementing fuzzy logic procedures, comprising:

a plurality of memory words, each memory word storing a corresponding membership function, and each memory word including:

a first portion in which a vertex of said corresponding membership function is stored;

a second portion in which a slope of a first side of said corresponding membership function is stored; and a third portion in which a slope of a second side of said corresponding membership function is stored;

wherein the second and third portions are configured to store the slopes such that the slope of the first side is adjustable independent of the slope of the second side and the slope of the second side is adjustable independent of the slope of the first side; and wherein each memory word is stored in the memory such that the processor accesses the memory word to perform an inference operation based upon the membership function represented thereby.

17. The memory according to claim 16, further comprising:

a plurality of memory sectors corresponding to a plurality of variables, wherein each memory sector includes a plurality of said memory words.

18. The memory according to claim 17, wherein each memory sector includes a predetermined plurality of memory words, wherein said predetermined plurality of memory words is as large as a largest term set for said plurality of variables.

19. The memory in accordance with claim 16, wherein each of the plurality of memory words includes fewer than seventeen bits.

20. The memory in accordance with claim 16, wherein each of the plurality of memory words consists of sixteen bits.

21. The memory in accordance with claim 16, wherein, for each of the plurality of memory words, a number of bits in the second portion is equal to a number of bits in the third portion.

22. The memory in accordance with claim 16, wherein a meaning of at least one of the slope of the first side and the slope of the second side of each membership function depends upon a value of a corresponding flag stored in a location other than in the memory word in which the slope of the at least one of the slope of the first side and the slope of the second side is stored, the corresponding flag never being stored in the memory word in which the slope of the at least one of the slope of the first side and the slope of the second side is stored.

23. The memory in accordance with claim 16, wherein said one side and said other side of each membership function intersect at the vertex of the membership function.

* * * * *